(12) United States Patent
Balinsky et al.

(10) Patent No.: US 7,262,781 B2
(45) Date of Patent: Aug. 28, 2007

(54) DOCUMENT CREATION SYSTEM AND RELATED METHODS

(75) Inventors: Helen Balinsky, Cardiff (GB); Brian Atkins, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 49 days.

(21) Appl. No.: 11/190,223

(22) Filed: Jul. 27, 2005

(65) Prior Publication Data

US 2006/0026507 A1 Feb. 2, 2006

(30) Foreign Application Priority Data

Jul. 27, 2004 (GB) .................. 0416640.1
Jan. 31, 2005 (GB) .................. 0501883.3

(51) Int. Cl.
*G09G 5/00* (2006.01)
(52) U.S. Cl. ..................................... 345/620
(58) Field of Classification Search ................ 345/620
See application file for complete search history.

(56) References Cited

U.S. PATENT DOCUMENTS

| | | | |
|---|---|---|---|
| 5,956,738 A | 9/1999 | Shirakawa | |
| 6,380,954 B1 | 4/2002 | Gunther | |
| 6,415,306 B2 | 7/2002 | Seaman | |
| 6,453,080 B1 * | 9/2002 | Kao | ............ 382/312 |
| 2002/0191861 A1 | 12/2002 | Cheatle | |
| 2003/0152291 A1 | 8/2003 | Cheatle | |

FOREIGN PATENT DOCUMENTS

| | | |
|---|---|---|
| EP | 1 184 808 A1 | 3/2002 |
| EP | 0 800 148 B1 | 7/2002 |
| EP | 1503336 A2 | 2/2005 |
| GB | 2378340 A | 2/2003 |
| WO | WO98/10356 | 3/1998 |
| WO | WO 01/39019 A2 | 5/2001 |
| WO | WO 02/37939 A2 | 5/2002 |
| WO | WO 02/084582 A2 | 10/2002 |

* cited by examiner

*Primary Examiner*—Kee M. Tung
*Assistant Examiner*—Motilewa Good-Johnson
(74) *Attorney, Agent, or Firm*—Thomas, Kayden, Horstemeyer & Risley, LLP (57) ABSTRACT

A method of creating a document having an allocated area in which information is placed, the method comprising:
i. providing a set of one or more content-items 300 which contain information to be displayed in the allocated area;
ii. identifying one or more content-items 300 from the set that it is desired to crop;
iii. identifying within the content-item that it is desired to crop a region of interest 302 that it is desired to maintain within the content-item 300;
iv. defining at least a first sub-area 314 within the content-item that lies outside the region of interest and which contains a point 604 that can be used to define a crop to be used on the content-item 300 to produce a cropped content-item 612;
v. selecting a cropped content-item 612 such that it includes the point 604 in the first sub-area 314;
vi. adding the cropped content-item 612 to the document and generating the document.

19 Claims, 10 Drawing Sheets

DOCUMENT CREATION SYSTEM AND RELATED METHODS

This invention relates to a document creation system and related methods. In particular, but not exclusively, the invention relates to customisation of printed documents.

It will be appreciated that a personalised item of sales literature, for example a brochure or an advertising flyer, is likely to result in more sales per literature item than an item of sales literature that is sent en masse to many customers. An item of sales literature that is produced for the general public will undoubtedly include information that is not of interest to all customers that receive the literature and each customer will have to look through the literature to find the parts that are of interest to them. Personalising an item of sales literature can include selecting specific content-items for a specific customer, and placing these in certain areas of a brochure or flyer in an aesthetically pleasing way. Thus, ideally each customer would receive a unique edition of the sales literature.

With the advent of databases holding information about customers', clients', etc. (hereinafter referred to as customer) preferences, purchases, past actions, and the like, it has become possible to generate targeted communications that are targeted specifically to a particular customer based upon the data held in the database. Such databases may be exemplified by so-called supermarket loyalty schemes. However, the skilled person will appreciate that such schemes are only one such example.

It will be appreciated that such databases may comprise many thousands (and even tens or hundreds of thousands or more) of customers. It would be impossible to check, manually, that targeted communications sent to such a number of people conform to accepted presentation rules within reasonable time scales. As such the process should be advantageously performed automatically.

Creating an item of sales literature can involve placing a number of content-items into an area of a document that has been allocated for that purpose. Sometimes content-items do not fit in areas of the document that have been allocated for them, and the content-item has to be cropped to adjust its aspect-ratio to be the same as the aspect-ratio of the allocated area of the document. It will be appreciated that once a content-item has the desired aspect-ratio (that is, the ratio of its height to its width) it can be resized without distorting it, to enable it to be placed into the allocated area of the document.

Known systems for automatically cropping content-items analyse properties of the content-item to determine where to crop. Such analysis comprises evaluating a cost function that can include detecting salient colours, and other low-level features to identify regions of an image that should not be cropped out of the image. These systems often do not indicate the true area of interest from a publishing point of view. In publishing scenarios, content can be limited to available stock photography, and often the object of interest may not be salient in a way that can be gauged by such low-level metrics.

Such known systems evaluate a cost function across the entire height and width of a content-item, and select the best positions to crop based on calculated values of the cost function. This can result in regions of the content-item that will not ultimately be included in the cropped version of the image having an effect on the cost function, thereby skewing the results.

US2002/0191860 (Cheatle) discloses a method of providing composition evaluation of an image by analysing the image with respect to predefined composition rules. The method can be used within an image capture system to indicate to a user suggested ways to frame the image, and hence adjust its composition by cropping out regions of the image that are deemed peripheral. The methods disclosed in this document are aimed at helping an unskilled photographer to improve their photo and makes certain assumptions. For example it assumes that the Region of Interest (ROI) should include salient areas and it gives a result with an error which is tolerable in the circumstances in which the method is used.

According to a first aspect of the invention there is provided a method of cropping a content-item, the method comprising:
  i. identifying within the content-item that is to be cropped a region of interest (ROI) that should be maintained within the content-item;
  ii. defining a line within the content-item that lies at an angle $\alpha$ to a predetermined reference line within the content-item, wherein the angle $\alpha$ is generally equal to $\tan^{-1}$ (desired aspect ratio);
  iii. selecting a cropped content-item such that opposite vertices of the cropped content-item lie on the line.

According to a second aspect of the present invention, there is provided a method of creating a document having an allocated area in which information is placed, the method comprising:
  i. providing a set of one or more content-items which contain information to be displayed in the allocated area;
  ii. identifying one or more content-items from the set that it is desired to crop;
  iii. identifying within the content-item that it is desired to crop a region of interest (ROI) that should be maintained within the content-item;
  iv. defining a line within the content-item that lies at an angle $\alpha$ to a predetermined reference line within the content-item, wherein the angle $\alpha$ is generally equal to $\tan^{-1}$ (desired aspect ratio);
  v. selecting a cropped content-item such that opposite vertices of the cropped content-item lie on the line; and
  vi. adding the cropped content-item to the document and generating the document.

According to a third aspect of the present invention, there is provided a document creation system arranged to generate a document including one or more cropped content-items comprising a supply of content-items, an identification means arranged to identify a content-item that it is desired to crop and further to identify a region of interest (ROI) within the identified content-item that should be maintained within the content-item and an analysing means arranged to analyse the identified content-item and define a line within the content-item that lies at an angle $\alpha$ to a predetermined reference line within the content-item, wherein the angle $\alpha$ is generally equal to $\tan^{-1}$ (desired aspect ratio) and further, the analysing means being arranged to select a cropped content-item such that opposite vertices of the cropped content-item lie on the line.

According to a fourth aspect of the present invention, there is provided a program arranged to create a document having an allocated area in which information is placed, the program comprising instructions to:
  i. provide a set of one or more content-items which contain information to be displayed in the allocated area;

ii. identify one or more content-items from the set that it is desired to crop;

iii. identify within the content-item that it is desired to crop a region of interest that it is desired to maintain within the content-item;

iv. define a line within the content-item that lies at an angle α to a predetermined reference line within the content-item, wherein the angle α is generally equal to $\tan^{-1}$ (desired aspect ratio);

v. select a cropped content-item such that opposite vertices of the cropped content-item lie on the line; and vi. add the cropped content-item to the document and generating the document.

According to a fifth aspect of the present invention, there is provided a machine readable medium holding instructions which when read by a machine cause that computer to perform the method of the first or second aspects of the invention.

According to a sixth aspect of the present invention, there is provided a machine readable medium holding instructions which when read by a machine cause that machine to function as the system of the first aspect of the invention.

According to a seventh aspect of the present invention, there is provided a machine readable medium holding instructions providing the program of the third aspect of the invention.

The machine readable medium of the fifth, sixth or seventh aspects of the invention may be any one or more of the following: a floppy disk; a CDROM/RAM; a DVD ROM/RAM (including +R/RW, -R/RW); any form of magneto optical disk; a hard drive; a memory; a transmitted signal (including an internet download, file transfer, or the like); a wire; or any other form of medium.

The skilled person will appreciate that any of the features discussed in relation to any of the above aspects of the invention may equally be applied to any of the other aspects of the invention.

An embodiment of the present invention is now described, by way of example only and with reference to the accompanying figures of which.

This particular invention may be used to automatically crop a content-item that is to be placed in a communication during creation of the communication. The content-item can be an image or photograph of goods that are to be sold, and the communication can be, but is not limited to, an item of sales literature comprising a printed document. For conciseness this method will hereinafter be described in relation to the cropping of images to be placed in a catalogue, although it has wider applicability. The method may for example be applied to photographs in a photo album. It may also be applied to drawings, charts, graphs or any other item that can be placed in a document. In some embodiments passages of text and titles can be considered as content-items. The communication may be an electronic document such as an email, web page, Adobe PDF file and the like, and generally the document will be stored in an electronic form in an electronic memory.

It is preferable that customised publications have images that are well cropped as a consumer would immediately dismiss, as being unprofessional, publications which contain an image showing only a portion of some of the goods due to a poor crop (i.e. the Region of interest has cut by the crop). Existing systems for automatic cropping have tended to focus on including the salient area of the image; thus a photograph of a person would be cropped, by prior art systems, to include the head and face since this would be the most salient part. In publishing is not necessarily true. For example a model is photographed to promote clothes and it is likely that if trousers are for sale that only a lower part of a resulting image would be held to be the region of interest. Determining whether an image (or other content-item) has been well cropped may also be influenced by the aesthetic criteria of emphasis. For example an item that is for sale is likely to have a relatively tight crop as it is of primary interest. Such a tight crop may not be appropriate if the image were of photograph for a family photograph album of a "family day out".

Goods can be advertised in tens, hundreds, or thousands of different items of sales literature, and having an image of the goods that is reusable in numerous different publications is provided by embodiments of the present invention. An image according to embodiments of the present invention has a region of interest that is considered essential to the image and contains the goods that are the subject of the image. The region of interest (ROI) should not, even partially, be cropped out of the image. The image also contains a peripheral area that is not essential to the image, which provides the image with a degree of flexibility. In catalogue-type documents the region of interest (ROI) would generally completely include an object for sale/sale item. The peripheral area enables the image to be cropped, and resized if necessary, so that it can be placed in areas of documents with varying aspect-ratios. It will be appreciated that an image may be resized as much as desired (according to other limitations which include avoiding pixilation of the image which may occur if the image is over enlarged, or loss of the detail if the image were overly reduced), without distortion, if the aspect ratio remains constant.

In some embodiments, images comprise a subject placed on a transparent background. These images have the advantage that they can be placed next to each other seamlessly, to form a composition that appears as though the subjects are all part of the same image on a common background. With these images the region of interest can be generated automatically, as it is the minimum region that contains all non-transparent pixels within the image. Generally, as is discussed in more detail later, embodiments of this invention do not identify the region of interest and the region of interest is specified in data associated with or within the content-item. It will be appreciated that in the field that is some times referred to as highly customised printing in which documents are automatically generated it is not practically possible for human checking of the document within reasonable time scales. Therefore, if there is an error in the region of interest it is likely that images may not be well cropped. However, it will be appreciated that embodiments of the invention are possible in which the ROI is determined by processing the content-item with an algorithm.

Figure 1:
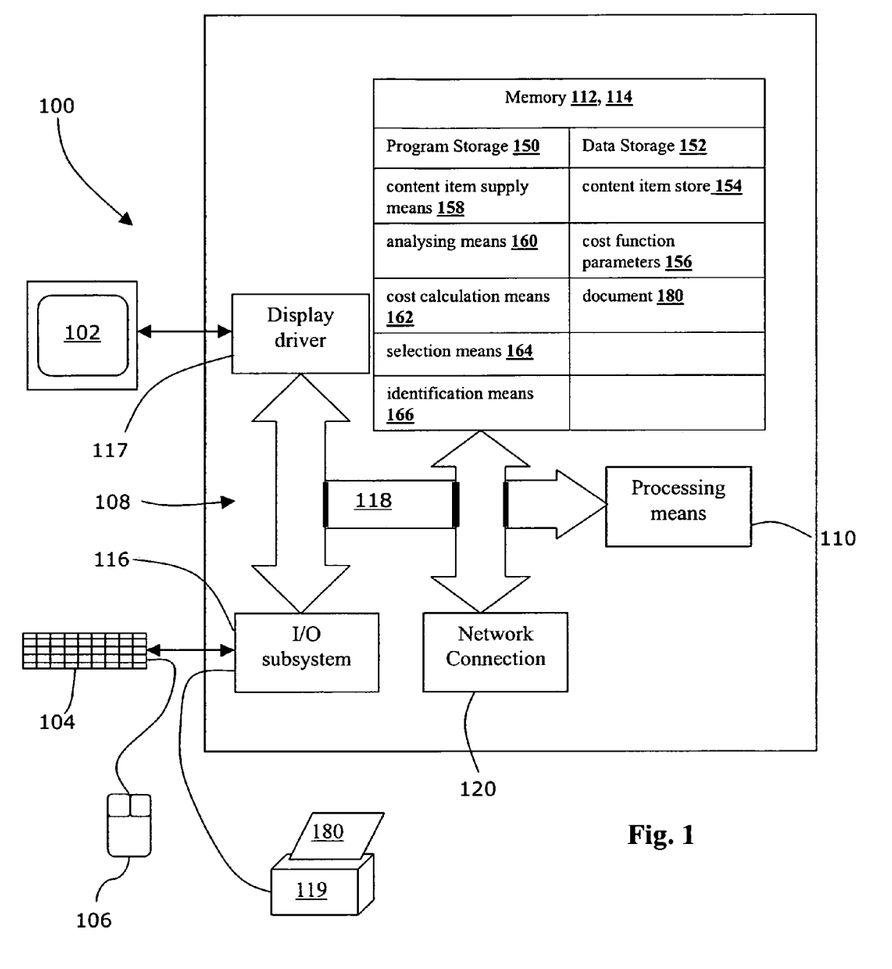
FIG. 1 schematically shows a computer arranged to provide one embodiment of the present invention.

FIG. 1 shows a computer 100 arranged to accept data and to process that data. The computer 100 comprises a display means 102, in this case an LCD (Liquid Crystal Display) monitor, a keyboard 104, a mouse 106 and processing circuitry 108. It will be appreciated that other display means such as LEP (Light Emitting Polymer), CRT (Cathode Ray Tube) displays, projectors, televisions and the like may be equally possible.

The processing circuitry 108 comprises a processing means 110, a hard drive 112, memory 114 (RAM and ROM), an I/O subsystem 116 and a display driver 117 which all communicate with one another, as is known in the art, via a system bus 118. The processing means 110 (often referred to as a processor) typically comprises at least one INTEL™ PENTIUM™ series processor, (although it is of course possible for other processors to be used) and performs calculations on data. The other processors may include processors such as the AMD™ ATHLON™, POWERPC™, DIGITAL™ ALPHA™, and the like.

The hard drive 112 is used as mass storage for programs and other data and may be used as a virtual memory. Use of the memory 114 is described in greater detail below.

The keyboard 104 and the mouse 106 provide input means to the processing means 110. Other devices such as CDROMS, DVD ROMS, scanners, etc. could be coupled to the system bus 118 and allow for storage of data, communication with other computers over a network, etc.

The I/O (Input/Output) subsystem 116 is arranged to receive inputs from the keyboard 104 and from the processing means 110 and may allow communication from other external and/or internal devices. The display driver 117 allows the processing means 110 to display information on the display 102.

The processing circuitry 108 further comprises a transmitting/receiving means 120, which is arranged to allow the processing circuitry 108 to communicate with a network. The transmitting/receiving means 120 also communicates with the processing circuitry 108 via the bus 118.

The processing circuitry 108 could have the architecture known as a PC, originally based on the IBM™ specification, but could equally have other architectures. The processing circuitry 108 may be an APPLE™, or may be a RISC system, and may run a variety of operating systems (perhaps HP-UX, LINUX, UNIX, MICROSOFT™ NT, AIX™, or the like). The processing circuitry 108 may also be provided by devices such as Personal Digital Assistants (PDA's), mainframes, telephones, televisions, watches or the like.

The computer 100 also comprises a printer 119 which may be thought of as a printing means which connects to the I/O subsystem 116. The printer 119 provides a printing means and is arranged to print documents 180 therefrom.

It will be appreciated that although reference is made to a memory 114 it is possible that the memory could be provided by a variety of devices. For example, the memory may be provided by a cache memory, a RAM memory, a local mass storage device such as the hard disk 112 (i.e. with the hard drive providing a virtual memory), any of these connected to the processing circuitry 108 over a network connection such as via the transmitting/receiving means 120. However, the processing means 110 can access the memory via the system bus 118, accessing program code to instruct it what steps to perform and also to access the data. The processing means 110 then processes the data as outlined by the program code.

The memory 114 is used to hold instructions that are being executed, such as program code, etc., and contains a program storage portion 150 allocated to program storage. The program storage portion 150 is used to hold program code that can be used to cause the processing means 110 to perform predetermined actions. Although expanded upon hereinafter the program storage portion 150 in particular provides a content item supply means 158, an analysing means 160, a cost calculation means 162, an identification means 166 and a selection means 164. It will be appreciated that whilst the items discussed in this paragraph, at least, are described as being provided by software, it would be equally possible to provide them in hardware.

The memory 114 also comprises a data storage portion 152 allocated to holding data and in embodiments of the present invention in particular provides a content item store 154 arranged to hold a supply of content-items, cost function parameters 156 and one or more electronically stored documents 180.

Figure 2:
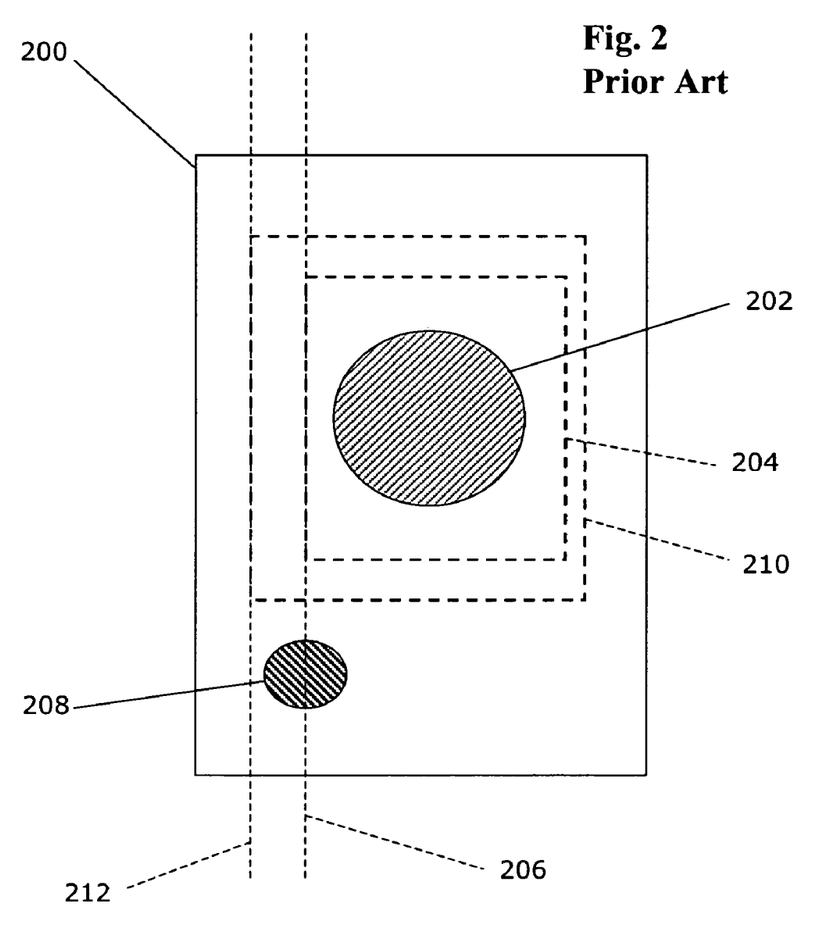
FIG. 2 shows how a prior art system can select how to crop a content-item.

FIG. 2 shows how a prior art system can evaluate potential ways of cropping a content-item. The content-item is an image 200 comprising two circles 202 and 208. The circle 202 is the element of the image that is desired to be maintained following a cropping operation, whereas circle 208 is non-essential and may be cropped out of the image 200. In one use of the image 200, the optimum crop is illustrated in the Figure as box 204.

This prior art system evaluates a cost function for the image 200 which assesses horizontal and vertical lines across the entire width/height of the image 200 to establish the best place to crop the image 200. A disadvantage of this prior art system is that regions of the image that are ultimately going to be cropped out of the image are considered by the cost function and can contribute significantly to the result given by the function.

In this example of the prior art system, the cost function is based upon a complex function including the colour and contrast, etc. of the image in horizontal and vertical bands to determine whether or not the horizontal and vertical positions are good places to crop the image. That is the system attempts to avoid cropping through "interesting", which may be thought of as salient, features of the image.

Often we do not want to cut objects and busy areas. As this prior art system evaluates the cost function along the line 206, it determines that there is a lot of changes/busy area in the image in the region of circle 208 and rejects this potential cropping position as unacceptable. When this prior art system evaluates the cost function along line 212, circle 208 is not considered by the cost function and the system determines that this is an acceptable position to crop the image 200. It will be appreciated that the ROI is the circle 202 whereas it is not so significant to keep the circle 208

The cropped version of the image created by this prior art system is shown as box 210, which contains what may deemed to be an unnecessary amount of blank space around circle 202 when compared with the optimum cropped version of the image as indicated by box 204. The system has selected how to crop the image by taking into account a region of the image (in this case circle 208) that is ultimately not going to be included in the cropped version of the image.

A further disadvantage of this prior art system is that there are potentially a high number of potential positions to crop such images, and it would be inefficient to calculate the cost function associated with all, or even a high number of, potential cropping positions; i.e. embodiments of the invention may be advantageous because they eliminate redundant searches.

Figure 3A:
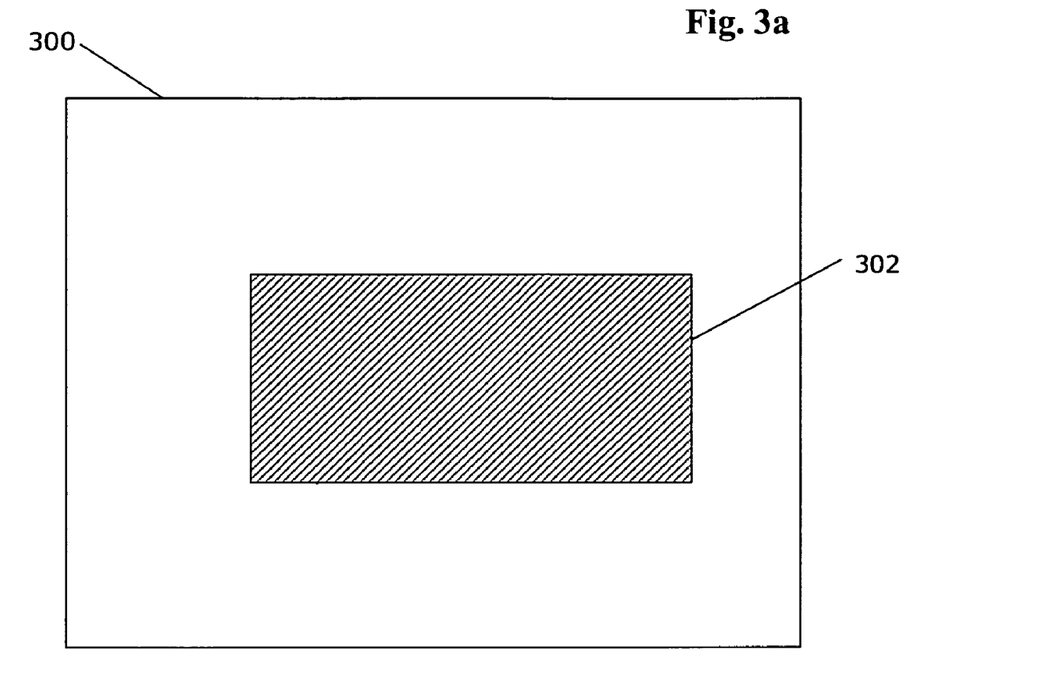
FIG. 3 shows how areas of a content-item suitable for cropping can be defined and restricted according to an embodiment of the present invention.

FIG. 3a shows schematically an image 300 that provides a content-item according to an embodiment of the present invention. The image 300 has a region of interest 302 that is held to be an area of the image that should not be cropped out of the image 300. The remainder of the image 300 is peripheral and can be cropped out of the image 300 if necessary. Generally, embodiments of the current invention would provide data detailing the location of the ROI within any content-item that would is to be processed.

Figure 3B:
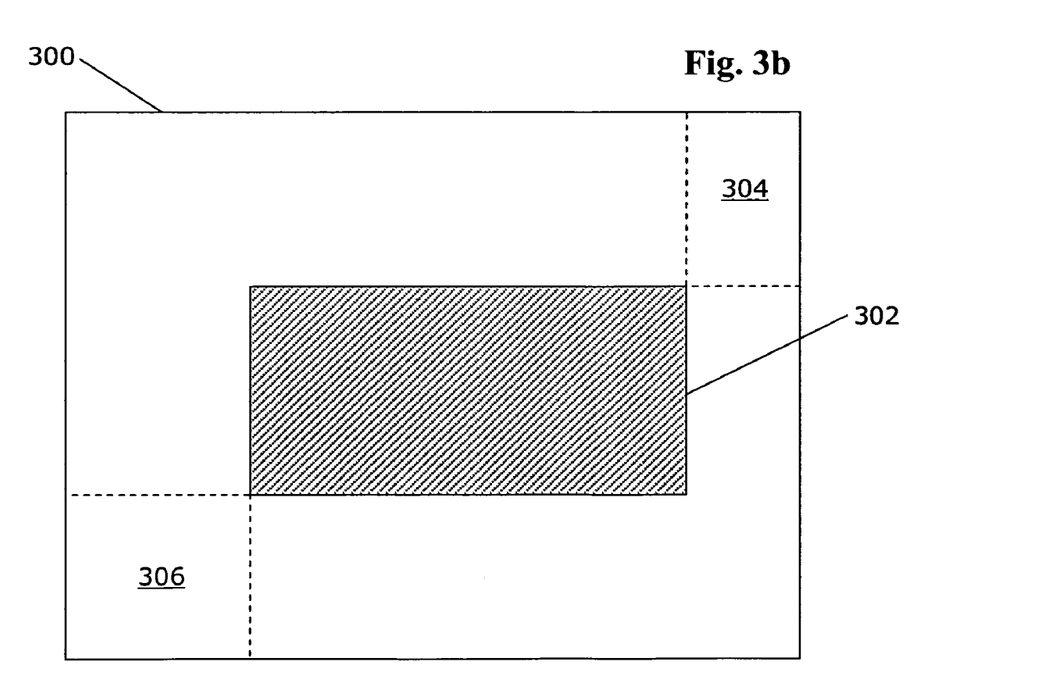

FIG. 3b shows two boxes 304, 306 located in diagonally opposite corners of the image 300 between the region of interest 302 and the boundaries of the image 300. It will be appreciated that if the cropped image is also to be rectangular then in order for the cropped version of the image to contain the entire region of interest 302, the upper right corner of the cropped version of the image will be within box 304, and that the lower left corner of the cropped version of the image will be within box 306. If the upper right corner and lower left corner of the cropped version of the image are not within boxes 304 and 306 respectively, at least some of the region of interest will be cropped out of the image 300. Generally, the cropped image will be rectangular and in particular a bottom edge of the cropped image will be parallel with the bottom edge of the content item.

In other embodiments, the same analysis is performed for the upper left and lower right corners of the cropped version of the image, which will yield the same results.

Figure 3C:
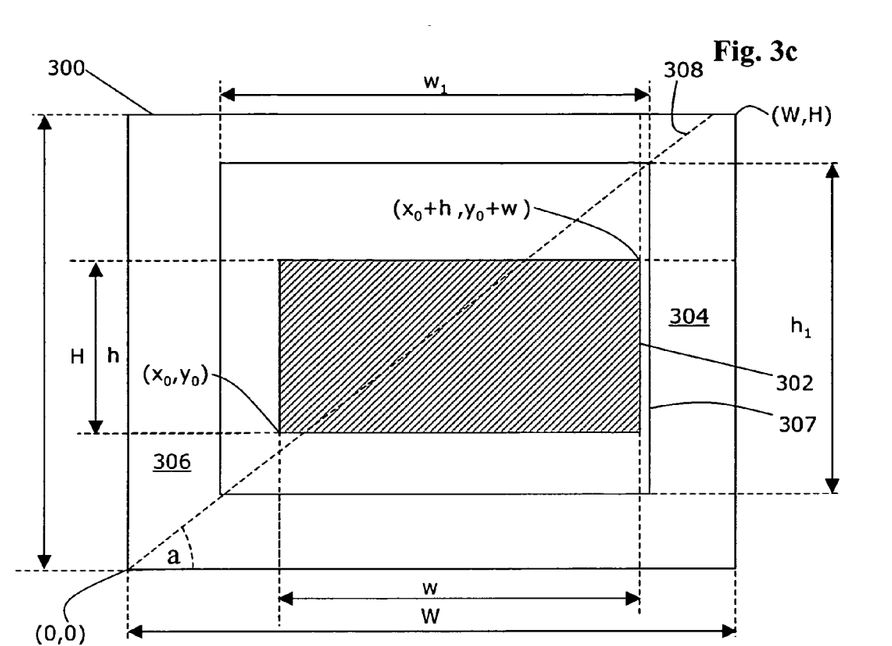

FIG. 3c has line 308 shown on the image 300. Line 308 schematically illustrates the target aspect ratio R of the cropped version of the image (height of cropped image/ width of cropped image). If the cropped content-item is rectangular, or square, in shape then the opposite corners of the cropped content-item having the aspect ratio R will lie on a line that is inclined at an angle $\alpha$ to the horizontal. Any example cropped image having a height $h_1$ and width $w_1$ is represented by the rectangle 307 and it will be seen that the lower left and upper right corners of the rectangle 307 lie on the line 308. The line 308 is inclined at an angle of a to a predetermined reference line within the content-item which in this embodiment is parallel with a bottom of the content-item (which generally would be termed horizontal), where $\alpha$ defines the aspect ratio of a rectangle to be constructed with diagonally opposite corners located on the line 308, as:

$$\tan(\alpha) = h_1/w_1 \quad (1)$$

referring to the dimensions shown on FIG. 3c. Therefore, $h_1/w_1$ is the same as the aspect-ratio of a rectangle created with diagonally opposite corners located on the line 308 (e.g. rectangle 307), and it follows that:

$$\tan(\alpha) = R \quad (2)$$

therefore maintaining a constant angle $\alpha$ maintains a constant aspect ratio R.

A suitable position to crop the image 300 (e.g. rectangle 307) should provide diagonally opposite corners of the cropped version of the image that can be joined by a line that is inclined by an angle of $\alpha$ to the predetermined reference line (generally horizontal); the diagonal of the cropped content-item should be inclined at an angle $\alpha$ to the horizontal. From equation (2), $\alpha$ is defined by $\alpha = \tan^{-1}(R)$ in order to meet the target aspect ratio R.

The co-ordinates of the lower left corner of the region of interest 302 with respect to the origin (which for convenience is defined as being the lower left corner of the original image 300) are taken to be $x_0$ and $y_0$. The original image 300 has a width W and an height H and the region of interest 302 has a width w and height h. Therefore, the upper right corner of the region of interest 302 is $(x_0+w, y_0+h)$. These dimensions and co-ordinates are shown on FIG. 3c.

The set of crops that include the region of interest includes rectangles having a range of aspect ratios. The minimum aspect ratio crop has aspect ratio h/W and the maximum ration is H/w. Since the region of interest 302 has a smaller area than the entire object, the following holds:

$$\frac{h}{W} \le \frac{H}{w}$$

It is known that the target aspect ratio is R and therefore the following equation should hold:

$$\frac{h}{W} \le R \le \frac{H}{w}$$

Figure 3D:
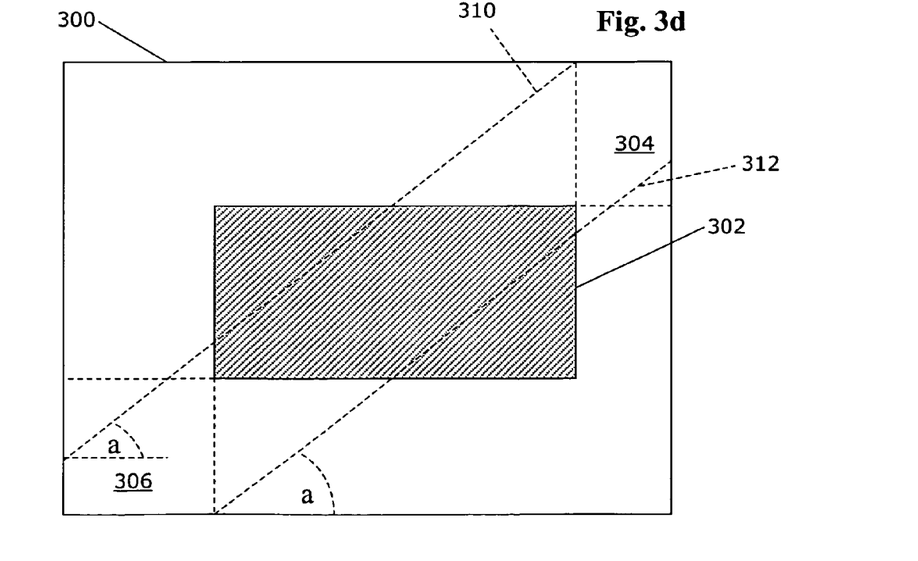

FIG. 3d shows the limits of the range of lines denoting the target aspect-ratio R that pass through both boxes 304, 306. This ensures that the region of interest 302 is included in the cropped version of the image. The line 310 is the upper limit of positions for a line at an angle of $\alpha$, and starts from the top left corner of box 304 and intercepts the top edge of box 306. Line 312 denotes the lower limit of positions for a line at an angle of $\alpha$, and starts from the lower right corner of box 306 and intercepts the bottom edge of box 304. If the corner of the cropped version of the image were within box 306 and above line 310, it could not have a diagonally opposite corner that would provide a cropped version of the image of the desired aspect ratio that contained all of the region of interest. The same is true for a point below line 312 in box 304. An equation $f_1(x)$ can be given for the line 310 providing the upper limit of positions and a further equation $f_2(x)$ can be given for the line 312 providing the lower limit as follows:

$$f_1(x) = r^*x + \min(y_0, H - r^*(x_0 + w))$$

$$f_2(x) = r^*x + \max(-r^*x_0, y_0 + h - r^*W)$$

Setting a required target aspect-ratio limits the number of potential crops that can provide an acceptable cropped version of the image and therefore may be considered as imposing a further constraint on the selection of the crop to perform on the content-item. Some embodiments may not perform a crop if the required target aspect-ratio cannot be achieved. Such a method provided by embodiments of the invention does not aim to improve a content-item, but aims to allow a portion of the content-item to be fitted into a specified/available area.

It will be appreciated that it is advantageous to reduce the number of potential crops since this can reduce the time taken to find a suitable solution. If the solution is to be found by searching then the space in which the search is performed is reduced which should therefore reduce the time taken to find a suitable solution.

Figure 3E:
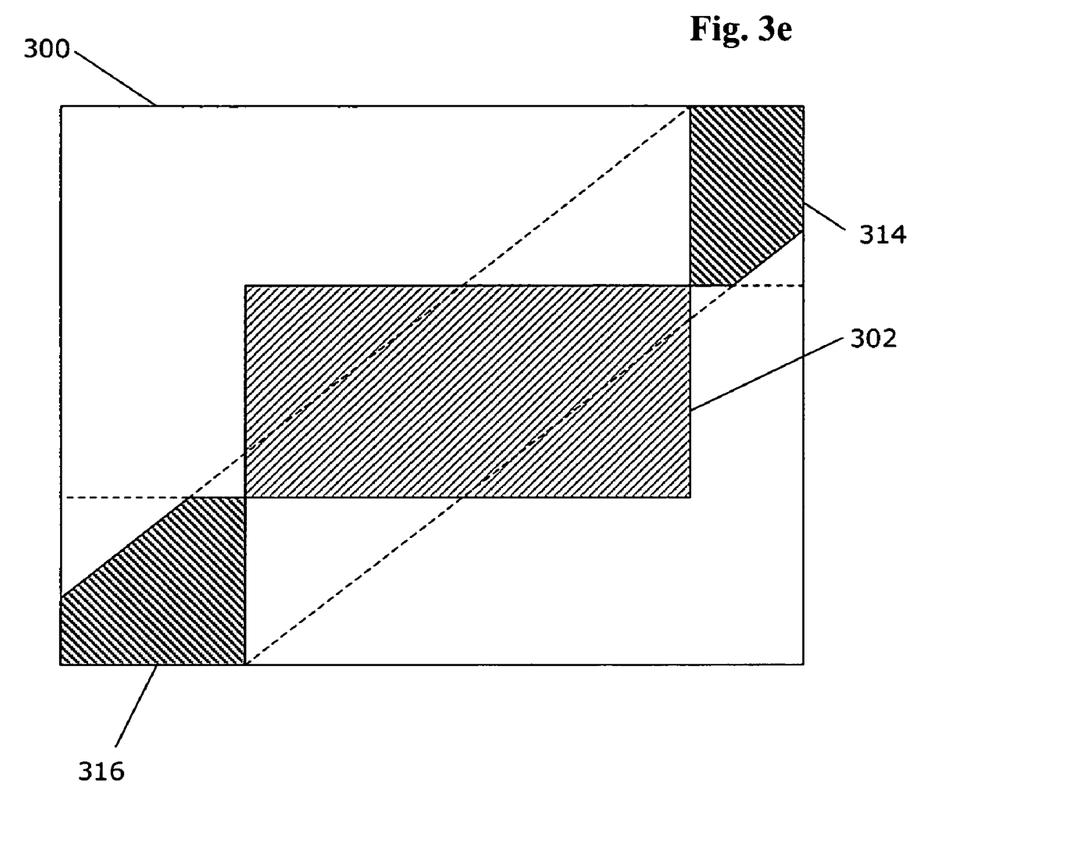

FIG. 3e shows image 300 and includes sub-regions 314 and 316 that show the only possible locations, in this embodiment, of the upper right and lower left corners to provide an acceptable cropped version of the image. Sub-regions 314 and 316 indicate regions where the intercept between a horizontal (i.e. parallel to a bottom/top of the page) and vertical (i.e. parallel to the sides of the page) crop provides a corner of a cropped version of the image that is of the desired aspect ratio and includes the entire region of interest. Thus, the sub-areas may be thought of sub-areas that contain points that define a crop; since, in this embodiment, the cropped content-item is rectangular in shape it can be defined by two diagonally opposite corners. Thus, it will be seen that, in this embodiment, the boxes 304 and 306 do not provide sub-areas that provide points that can be used do define a crop; there are points within the boxes 304, 306 which are not suitable since any cropped image created using those points would not have the desired aspect ratio.

Having restricted the number of possible locations that the image 300 can be cropped to a manageable number, that is crops that intercept sub-areas 314, 316, a cost function can be evaluated for the potential crops and the best one can be chosen. In some embodiments a score is allocated to each of the potential crops and the crop with the highest score is chosen.

Crops can be given scores based on a number of pre-defined rules. For example physical properties of the pixels of the image that will be on the boundary of the cropped version of the image, how the boundaries of the cropped version of the image compare with any neighbouring content-items or a background if there is one, customer preferences, or any other design rule.

As an example, if the background of a catalogue were a sky blue colour, it may not be desirable to crop an outdoor photograph so that the blue of the sky runs up against the border of the cropped photograph. The colours of the sky in the photograph and the blue of the page background would run together creating an undesirable appearance. In another example, consider placing two photographs of a person in front of green foliage next to each other. It may be undesirable to crop the photographs so that foliage is on the border of both photographs, as the two would run together.

Another possible design rule or customer preference can define how large or small the region of interest should be in the cropped version of the image. For example, if the resolution of an image is poor, it may be preferable to crop the image so that the region of interest is relatively small within the cropped version, and therefore does not exemplify the poor resolution of the image. In such cases, potential crops that are tight to the region of interest can be given a lower score.

Similarly, it may be preferable to crop images that are "busy" so that the region of interest is relatively large in the cropped version of the image. In these cases, the potential crops that are tight to the region of interest are given a high score.

Figure 4:
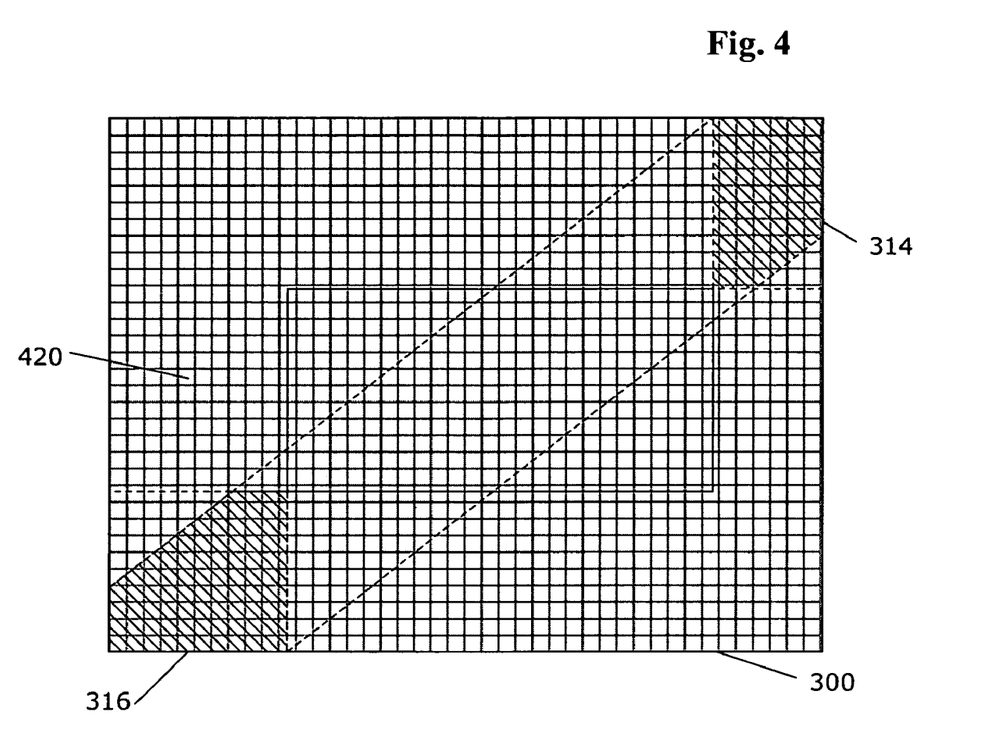
FIG. 4 shows how the content-item of FIG. 3 can be split into sub-regions according to an embodiment of the present invention.

FIG. 4 shows how the image of FIG. 3 can be split into sub-regions as defined by the grid 420. In this embodiment, each square defined by the grid 420 corresponds to a pixel within the image 300. It will be appreciated that, for reasons of clarity, the pixels are shown much larger in the Figure than they generally would be.

Once the sub-regions 314, 316 have been defined a cost function is evaluated for all of the rows and columns containing a pixel that is located within sub-regions 314 and 316. These are identified as the only positions that a satisfactory crop can be performed and are the only potential boundaries of a cropped version of the image. As will be noted from the discussion above in relation to FIGS. 3c and 3d, a point in the sub-region 314 (the upper rightmost sub-region) should be linked to a point in the sub-region 316 (the lower leftmost sub-region) by a line inclined at an angle α in order that the aspect ratio of the cropped image is as desired.

A cost function may be provided for all possible cropping positions at relatively low cost, as the number of potential cropping positions has been restricted as discussed earlier. One advantage of the embodiment being described is that the cost function is not unnecessarily evaluated for cropping positions that cannot provide a cropped version of the image of the desired aspect ratio or versions that do not include the region of interest. Exhaustively evaluating the cost function for all potential cropping positions (i.e. those with a start and end point in a sub-region 314, 316) ensures that the best cropping position is found and this may be performed by some embodiments. Also, where all of the potential cropping positions do not generate a minimum score, a warning can be provided to the user that this is the case. The user can use this early warning to alter the layout of the document, and avoid spending unnecessary time in attempting to crop the images to generate an acceptable composition of images.

In other embodiments the cost function is only calculated for a selected sample of the sub-regions that have been identified as potentially providing a suitable location for a corner of a cropped version of the image. For example, a predetermined number of solutions may be evaluated. Alternatively, solutions may be evaluated until a predetermined score is achieved by an algorithm used to evaluate each solution. In yet a further alternative embodiment, solutions to the cost function may be evaluated for a predetermined time.

Figure 5:
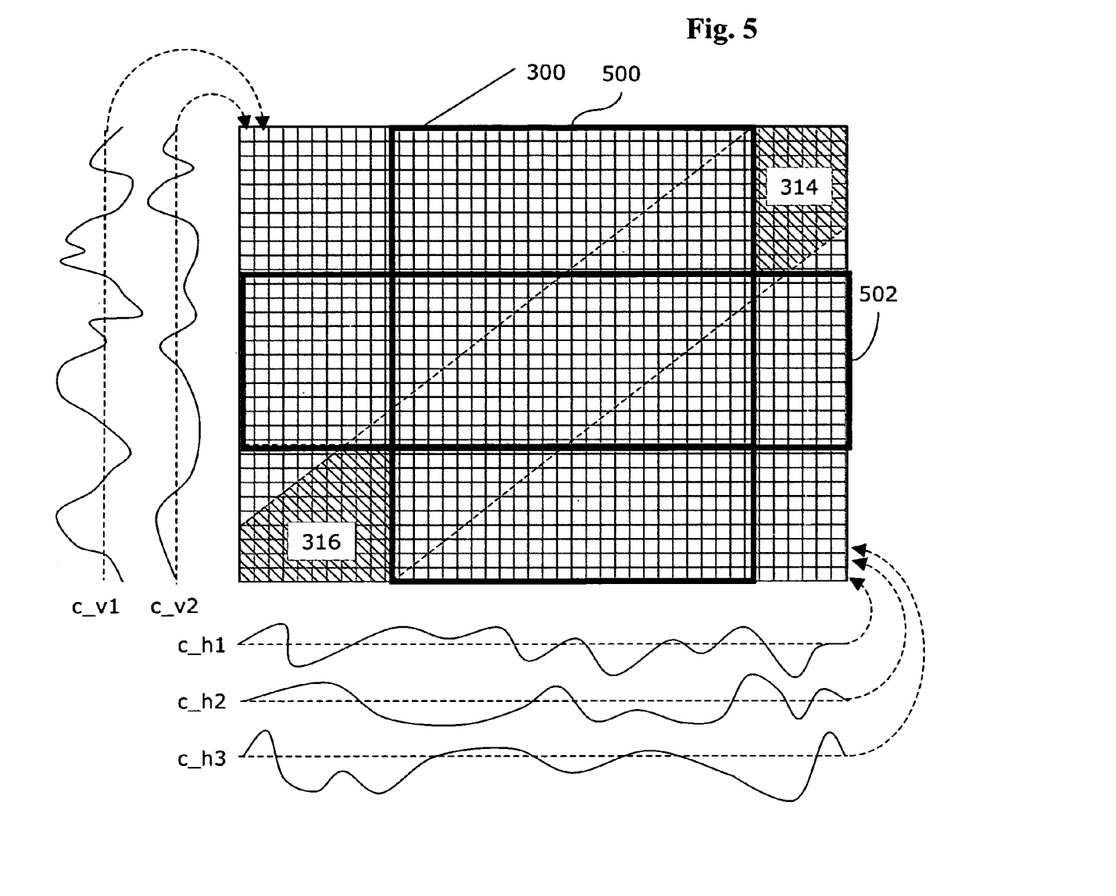
FIG. 5 shows how a cost function can be evaluated for certain region of a content-item according to embodiments of the present invention.

FIG. 5 shows the image 300 including the two sub-regions 314, 316 that contain the only pixels that can provide diagonally opposite corners of a suitable cropped version of the image. A cost function is calculated along horizontal and vertical lines that pass through sub-regions 314, 316 and are stored for subsequent use when calculating scores associated with specific crops. The costs functions shown represent a value that has been calculated for row/column of pixels within the proposed cropped content-item.

The cost functions are calculated using wavelets as these may allow better detection of image features, and may provide more accurate values if an image has noise associated with it. Two examples of wavelet cost functions calculated for vertical columns of pixels are shown as $c\_v1$ and $c\_v2$, and three wavelet cost functions for horizontal rows of pixels are shown as $c\_h1$, $c\_h2$ and $c\_h3$. It will be appreciated that cost functions based on wavelets are also calculated for all other rows and columns of pixels that pass through either sub-region 314 or 316, and these are not shown in the Figure to aid clarity. The costs functions shown represent a value that has been calculated for two columns and three rows of pixels within the proposed cropped content-item. In order to save processing time it will be appreciated that it is possible to pre-calculate the cost function for the image. This pre-calculated cost function may be subsequently be modified as required in order to generate a cost function for any one cropped content-item (which may be for example $c\_v1$, $c\_v2$, $c\_h1$, $c\_h2$, $c\_h3$, etc.). It should be appreciated that the cost functions shown in this Figure have not been calculated and are shown merely by way of example.

In this embodiment, all potential cropped versions of the image can then be evaluated and attributed with a score by adding the sections of the cost functions that correspond to the sides of the cropped version of the image.

In some embodiments of the invention an accumulative cost function is computed in a vertical direction for the columns above sub-region 316 and below sub-region 314. Subsequently, when processing a cost function for each of the potential cropped content-items the values may only be stored for:

the actual length of the vertical edge of a cropped content-item having a lower left apex within the sub-region 316 and a correspondent upper right apex within sub-region 314; and/or the actual length of a the vertical edge of a cropped content-item having an upper right apex within the sub-region 314 and a correspondent lower left apex within the sub-region 316.

Similarly, an accumulative cost function may be calculated in a horizontal direction for the rows originating from points within sub-region 314 and to the left thereof and rows originating from points within sub-region 316 and to the right thereof. Then values may only be stored for the actual length of the horizontal edge of a cropped content-item having a lower left apex within the sub-region 316 and a correspondent upper right apex within sub-region 314; and/or the actual length of a the horizontal edge of a cropped content-item having an upper right apex within the sub-region 314 and a correspondent lower left apex within the sub-region 316.

As can be seen from FIG. 5 there will be a maximum width 502 and a maximum height 500 cropped content-item (assuming that no scaling of the content-item).

It will be appreciated that by using the line inclined at the angle α the search space may be restrained such that it is possible, in some embodiments, to calculate a cost function for every cropped content-item. That is each pixel within the sub-regions 314 and 316 may have a plurality of cropped content-items that can be generated therefrom treating that pixel as a vertex of the cropped content-item.

The process of searching for the best cropped content-item may be as follows:

1. For every pixel $P_i$ in sub-region 316 intersect diagonal inclined at the angle α through $P_i$ and sub-region 314;
2. for every point from this intersection compute associated cost function score and total score for the correspondent crop; and
3. use the highest or lowest score (as appropriate) to determine the cropped content-item that should be used.

An advantage of such a search is that ensures that no redundant points are checked which may therefore result in a fast and efficient search.

Figure 6:
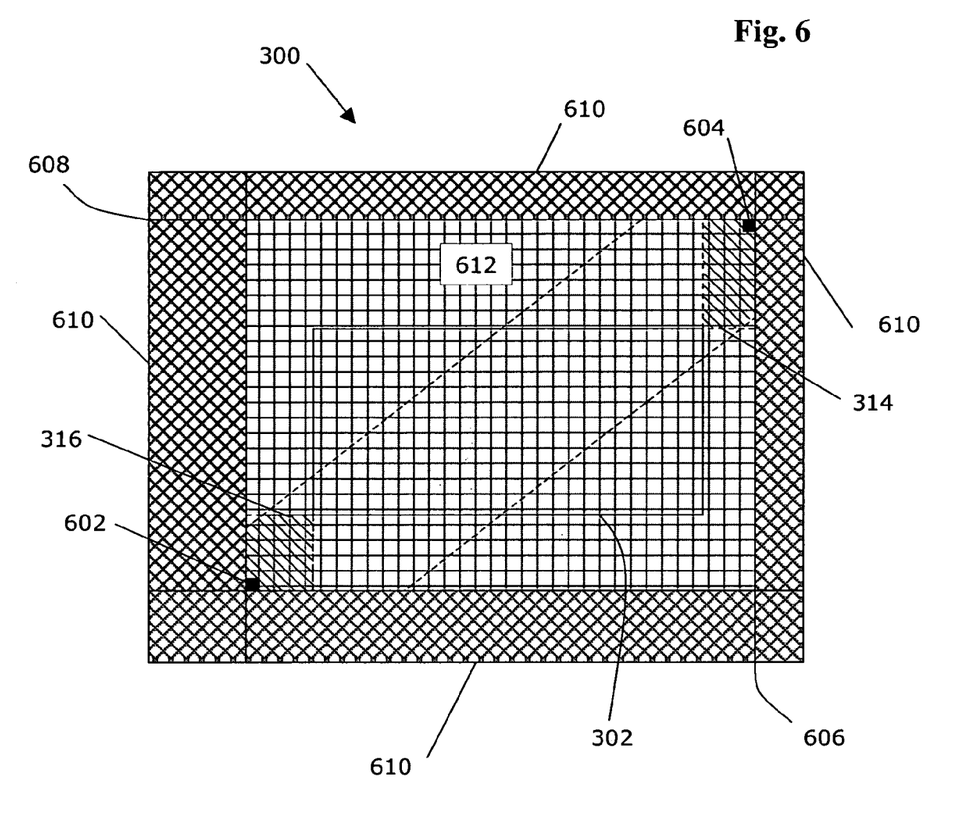
FIG. 6 shows how a content-item can be cropped according to an embodiment of the present invention.

FIG. 6 shows an image that has had a score allocated to all potential cropped versions of the image as defined by versions of the image having diagonally opposite corners present in the sub-regions 314, 316. In this example, it has been determined that the best score is obtained by having pixels 602 and 604 as diagonally opposite corners of the cropped version of the image. Peripheral regions 610 (highlighted as the region with cross hatching in two directions) have been cropped out of the image 300 to leave region 612 as the cropped version of the image that includes the region of interest and is of the desired aspect ratio. It will be appreciated than in the extreme situation the point in the sub-region 316 and/or the point in the sub-region 314 may lie on a boundary of the region of interest. The first and second sub-regions 314, 316 and the region of interest 302 may therefore be considered to have common boundaries at the corner regions thereof.

Figure 7:
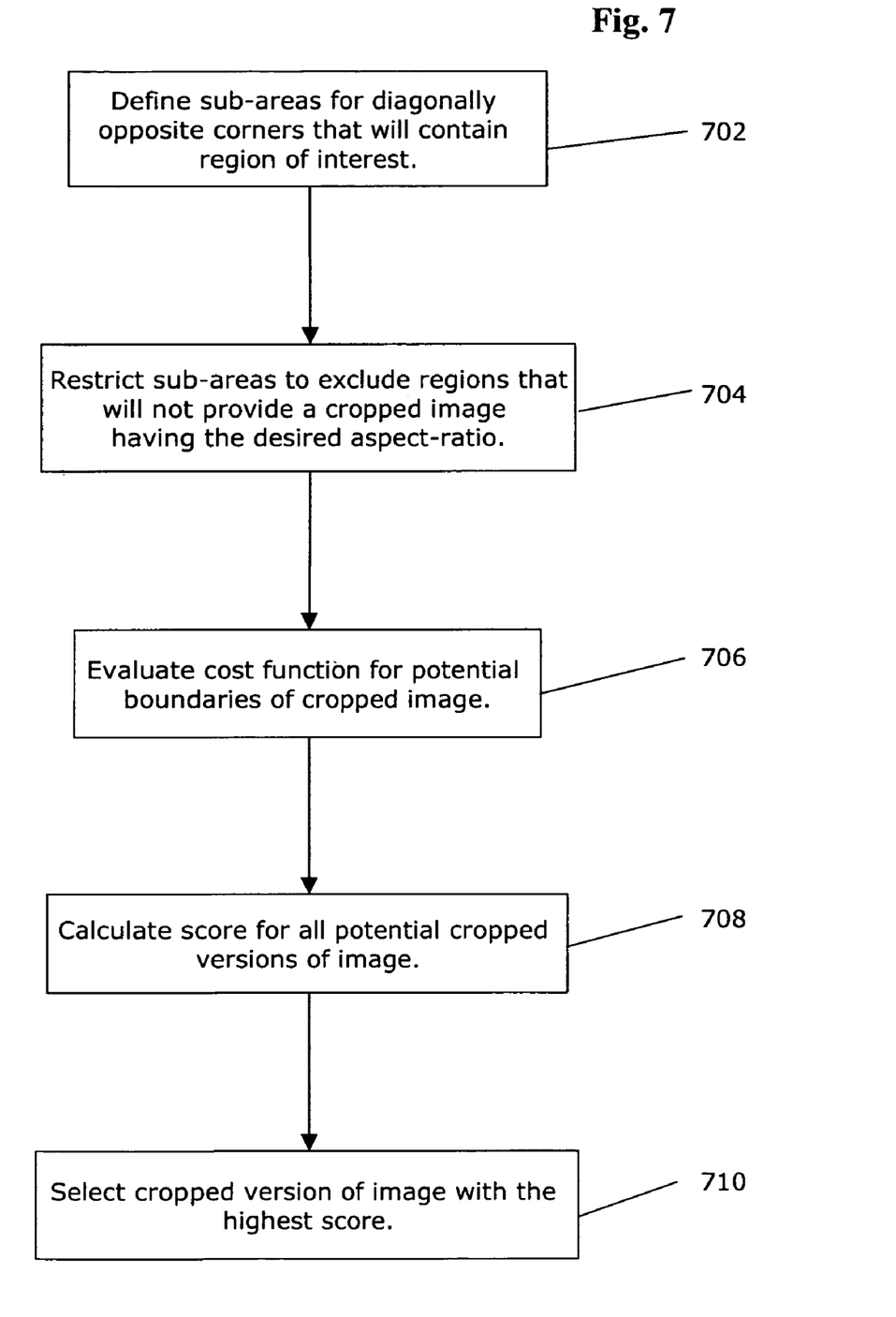
FIG. 7 shows a flowchart outlining the steps performed when cropping a content-item according to embodiments of the present invention.

FIG. 7 shows a flowchart outlining a method for automatically cropping a content-item according to one embodiment of the present invention. At step 702 and after the identification means 166 has identified the content-item that it is desired to crop, the method defines two sub-areas that are diagonally opposite across a region of interest of the content-item. The sub-areas lie outside the region of interest and should each contain a corner pixel of a cropped version of the content-item in order that the region of interest is included in the cropped version of the content-item. Thus, a rectangular cropped content-item is defined by the points lying in each of the sub-areas. This is as illustrated in FIG. 3b.

The region of interest within the content-item may be specified within the data stored in the content-item store 154. In such embodiments the identification means 166 may be arranged to access this information and identify the region of interest. In such embodiments a human operator may identify within each content-item a region of interest by specifying a region, which would generally rectangular, that envelopes the region that is intended to be maintained in any cropped version of the content item. In other embodiments the region of interest may be determined by an algorithm run on a content-item which may be performed by the identification means 166. The algorithm may be run on each content-item as the content-item is accessed or may be run on the content-item before the content-item is accessed.

At step 704, the sub-areas defined in step 702 are further restricted to only include areas that can contain corners of a cropped version of the content-item that will have a desired aspect ratio. This is as shown in FIG. 3e. The program storage portion 150 of memory 112, 114 provides an analysing means 160 that can perform steps 702 and 704 of the method.

At step 706, a cost function is evaluated for all horizontal and vertical rows/columns of pixels that pass through the areas defined at step 704. The program storage portion 150 of memory 112, 114 provides a cost calculation means 162 that can perform this step of the method. The horizontal and vertical rows/columns passing through these areas define all potential boundaries of a satisfactory cropped version of the content-item.

From the cost function, a score is determined for the boundaries of all potential cropped versions of the content-item based on the cost functions calculated at step 708. The cropped version with the highest score is then selected at step 710. The program storage portion 150 of memory 112, 114 provides a selection means 164 that can perform this step of the method.

Figure 8:
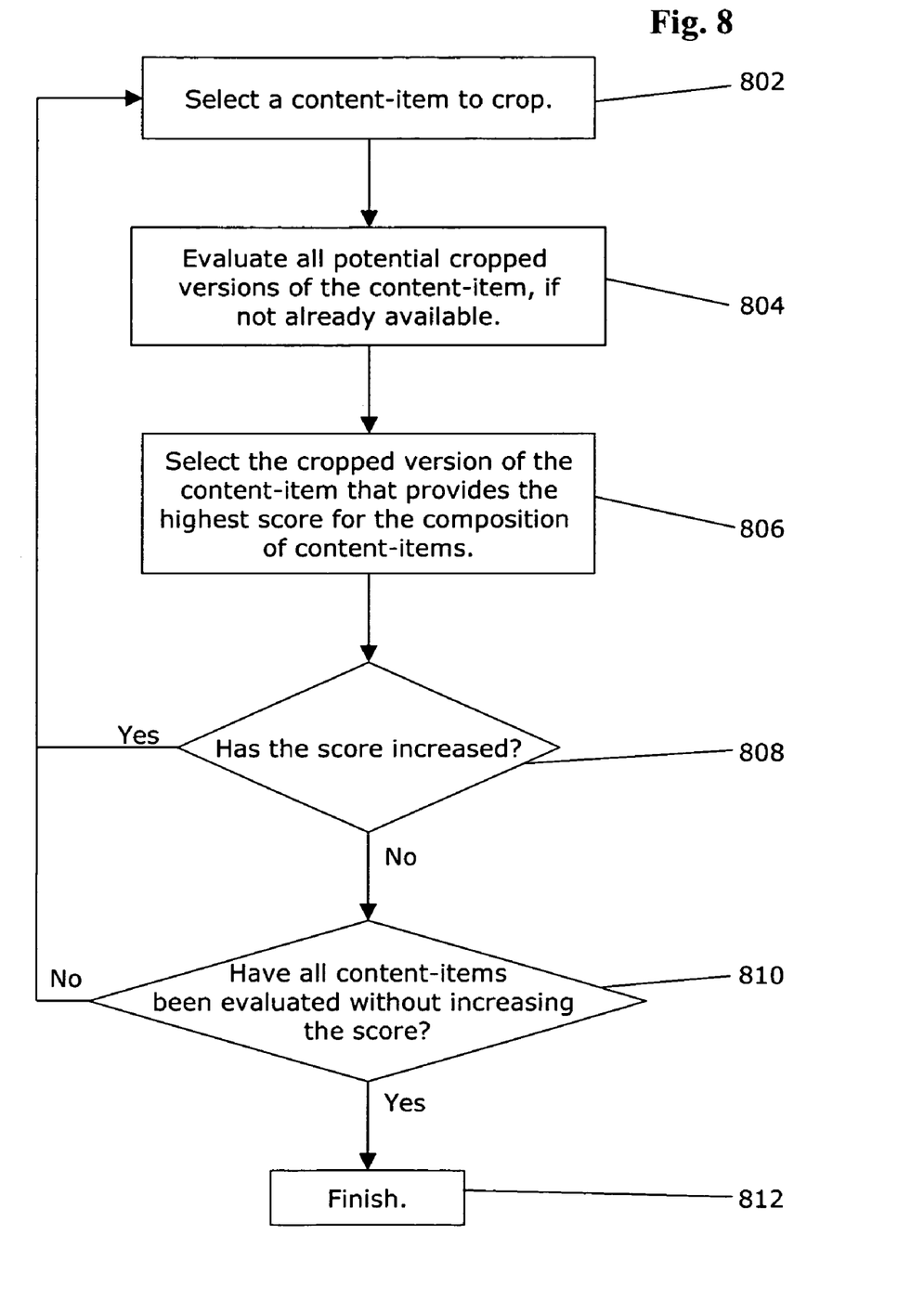
FIG. 8 shows a flowchart outlining the steps performed when cropping content-items within a composition of content-items according to the present invention.

FIG. 8 shows a method for selecting the best positions to crop various content-items within a composition of content-items. At step 802 a content-item is selected to be cropped, and at step 804 a cost function is evaluated for all potential borders of a satisfactory cropped version of the content-item, if they have not been evaluated already.

At step 806, a score is allocated for the composition of all of the content-items based on a number of design rules. The position to crop the content-item selected at step 802 is chosen so that the score of the composition of content-items is increased if possible. The score is not calculated for the content-item in isolation, the score takes into account the environment of the content-items, and how all of the content-items in the composition interact with each other.

At step 808, the method determines whether or not the score of the composition of content-items has increased, and if it has another content-item is selected at step 802. If the method determines that the score has not increased, the method evaluates whether or not all of the content-items have been evaluated without increasing the score at step 810, and continues selecting content-items to be evaluated until this is the case.

Once all content-items have been evaluated without increasing the score the method finishes at step 812, having chosen the cropped version of each individual content-item that provides the highest score for the composition of content-items as a whole.

In the above embodiment it is assumed that the cropped content-item will be square or rectangular in shape. This need not be the case and it may be possible to apply similar algorithms to content-items of other shapes. For example, circles, triangles, pentagons, hexagons, and the like may each be suitable.

The invention claimed is:

1. A method of cropping a content-item, the method comprising:
   i. identifying within the content-item that is to be cropped a region of interest (ROI) that should be maintained within the content-item;
   ii. defining a line within the content-item that lies at an angle $\alpha$ to a predetermined reference line within the content-item, wherein the angle $\alpha$ is generally equal to $\tan^{-1}$ (target aspect ratio of cropped content-item);
   iii. selecting a cropped content-item for placement in a document such that opposite vertices of the cropped content-item lie on the line.

2. A method according to claim 1 in which the steps are provided in the order shown.

3. A method according to claim 1 in which the region of interest is identified by accessing data for the content-item and/or by processing the content-item with an algorithm.

4. A method according to claim 1 in which the region of interest and/or the cropped content-item are rectangular and/or square in shape.

5. A method according to claim 1 in which there are defined at least a first and a second sub-area within the content-item, each of which lies outside the region of interest, and/or has a common boundary with the region of interest, and contains a point that can be used to define a crop to be used on the content-item to produce a cropped content-item wherein a point within, or on a boundary of, the first sub-area is linked to a point within, or on a boundary of, the second sub-area by the line inclined at the angle $\alpha$.

6. A method according to claim 1 which evaluates a plurality of crops that could be performed on the content-item and selects the cropped content-items from the crops that have been evaluated.

7. A method according to claim 6 in which one of the following occurs:
   1. all of the possible crops are evaluated;
   2. a predetermined number of crops are evaluated;
   3. crops are evaluated for a predetermined length of time; and
   4. crops are evaluated until a cropped content-item meeting a predetermined criterion is obtained.

8. A method according to claim 6 in which a cost function is used to evaluate the crops that could be performed on the content-item.

9. A method according to claim 8 in which the cost function is performed on the cropped content-item that would be generated by the crop being evaluated.

10. A method according to claim 8 in which the cost function takes into account any of the following: pixels on a boundary of the cropped content-item; neighbouring content-items in the document being generated to the content-item being processed; the background onto which the cropped content-item will be placed; and user preferences.

11. A method according to claim 10 which further comprises a cost calculation means arranged to assess a cost function for a cropped content-item produced by the analysing means.

12. A computer readable medium containing having instructions which when read onto a computer cause that computer to perform the method of claim 1.

13. A method of creating a document having an allocated area in which information is placed, the method comprising:
   i. providing a set of one or more content-items which contain information to be displayed in the allocated area;
   ii. identifying one or more content-items from the set that it is desired to crop;
   iii. identifying within the or each content-item that it is desired to crop a region of interest (ROI) that should be maintained within the content-item;
   iv. defining a line within the or each content-item that lies at an angle $\alpha$ to a predetermined reference line within the content-item, wherein the angle $\alpha$ is generally equal to $\tan^{-1}$ (target aspect ratio of cropped content-item);
   v. selecting a cropped content-item for the or each content item such that opposite vertices of the cropped content-item lie on the line; and
   vi. adding the or each cropped content-item to the document and generating the document.

14. A document creation system arranged to generate a document including one or more cropped content-items comprising a supply of content-items, an identification means arranged to identify a content-item that it is desired to crop and further to identify a region of interest (ROI) within the identified content-item that should be maintained within the content-item and an analysing means arranged to analyse the identified content-item and define a line within the content-item that lies at an angle $\alpha$ to a predetermined reference line within the content-item, wherein the angle $\alpha$ is generally equal to $\tan^{-1}$ (desired aspect ratio) and further, the analysing means being arranged to select a cropped content-item for placement in a document such that opposite vertices of the cropped content-item lie on the line.

15. A system according to claim 14 in which the analysing means is arranged to generate a first and a second sub-area which lie outside the region of interest and/or have a common boundary therewith and each contain a point that can be used to define a crop to be used on the content-item to produce a cropped content-item wherein a point within, or on a boundary of, the first sub-area is linked to a point within, or on a boundary of, the second sub-area by the line inclined at the angle $\alpha$.

16. A system according to claim 14 in which the identification means is arranged to generate cropped content items which are rectangular and/or square in shape.

17. A computer readable medium containing having instructions which when read onto a computer cause that computer to perform as the system of claim 14.

18. A computer readable medium embodying a computer program arranged to create a document having an allocated area in which information is placed, the program comprising instructions to:
   i. provide a set of one or more content-items which contain information to be displayed in the allocated area;

ii. identify one or more content-items from the set that it is desired to crop;
iii. identify within the content-item that it is desired to crop a region of interest that it is desired to maintain within the content-item;
iv. define a line within the content-item that lies at an angle α to a predetermined reference line within the content-item, wherein the angle α is generally equal to $\tan^{-1}$ (desired aspect ratio);
v. select a cropped content-item such that opposite vertices of the cropped content-item lie on the line; and
vi. add the cropped content-item to the document and generate the document.

19. A computer readable medium having instructions which provide the program of claim 16.

\* \* \* \* \*